United States Patent [19]

Cahill-O'Brien et al.

[11] Patent Number: 5,438,841
[45] Date of Patent: Aug. 8, 1995

[54] PRE-TRIP SYSTEM FOR A CONTROLLED ATMOSPHERE SYSTEM FOR A REFRIGERATED CONTAINER

[75] Inventors: Barry P. Cahill-O'Brien; Michael W. Nevin, both of Syracuse; Dennis W. Sullivan, Elbridge, all of N.Y.

[73] Assignee: Carrier Corporation, Syracuse, N.Y.

[21] Appl. No.: 259,837

[22] Filed: Jun. 15, 1994

[51] Int. Cl.⁶ ............................................. F24F 3/16
[52] U.S. Cl. .................................... 62/78; 62/228.1; 426/418
[58] Field of Search ................ 62/78, 228.1; 426/418, 426/419

[56] References Cited

U.S. PATENT DOCUMENTS

| | | | |
|---|---|---|---|
| 5,120,329 | 6/1992 | Saurer et al. | 62/78 |
| 5,156,009 | 10/1992 | Woodruff | 62/78 |
| 5,355,781 | 10/1994 | Liston et al. | 62/78 |

*Primary Examiner*—Ronald C. Capossela

[57] ABSTRACT

Pre-trip operational methods and procedures for automatically checking predetermined functions and the operating performance of a controlled atmosphere system for a refrigerated container. The system includes an electronic control and electrically controlled components including an air compressor, a filter having a drain valve, a heater, a nonelectric membrane separator and two or more flow control valves for varying the purity and the flow from the membrane separator. Various pressure, temperature and safety control devices are provided in the system. The methods include display tests of the indicator lights and display segments on the controller, tests of the drain valves on the filters and of the flow control valves. Tests of the heater and its control and safety mechanisms are carried out. Automatic tests are conducted of the oxygen sensor and $CO_2$ sensor including span tests and zero point value tests. Tests of the membrane assembly are conducted to determine if the required purity of nitrogen can be generated from the membrane separator. Pass or fail indications are provided via a display which indicates the test being conducted and the result of the test.

8 Claims, 11 Drawing Sheets

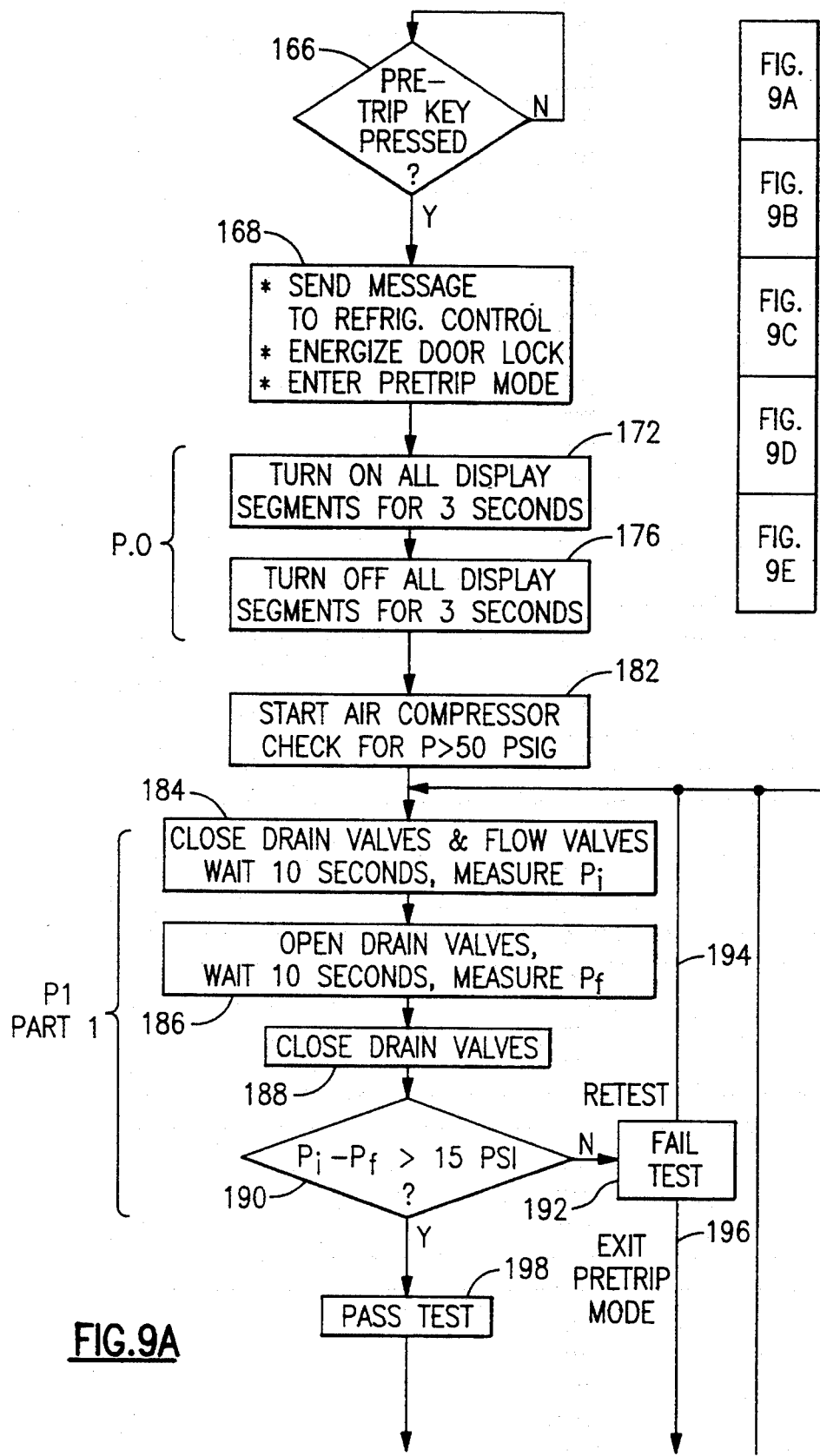

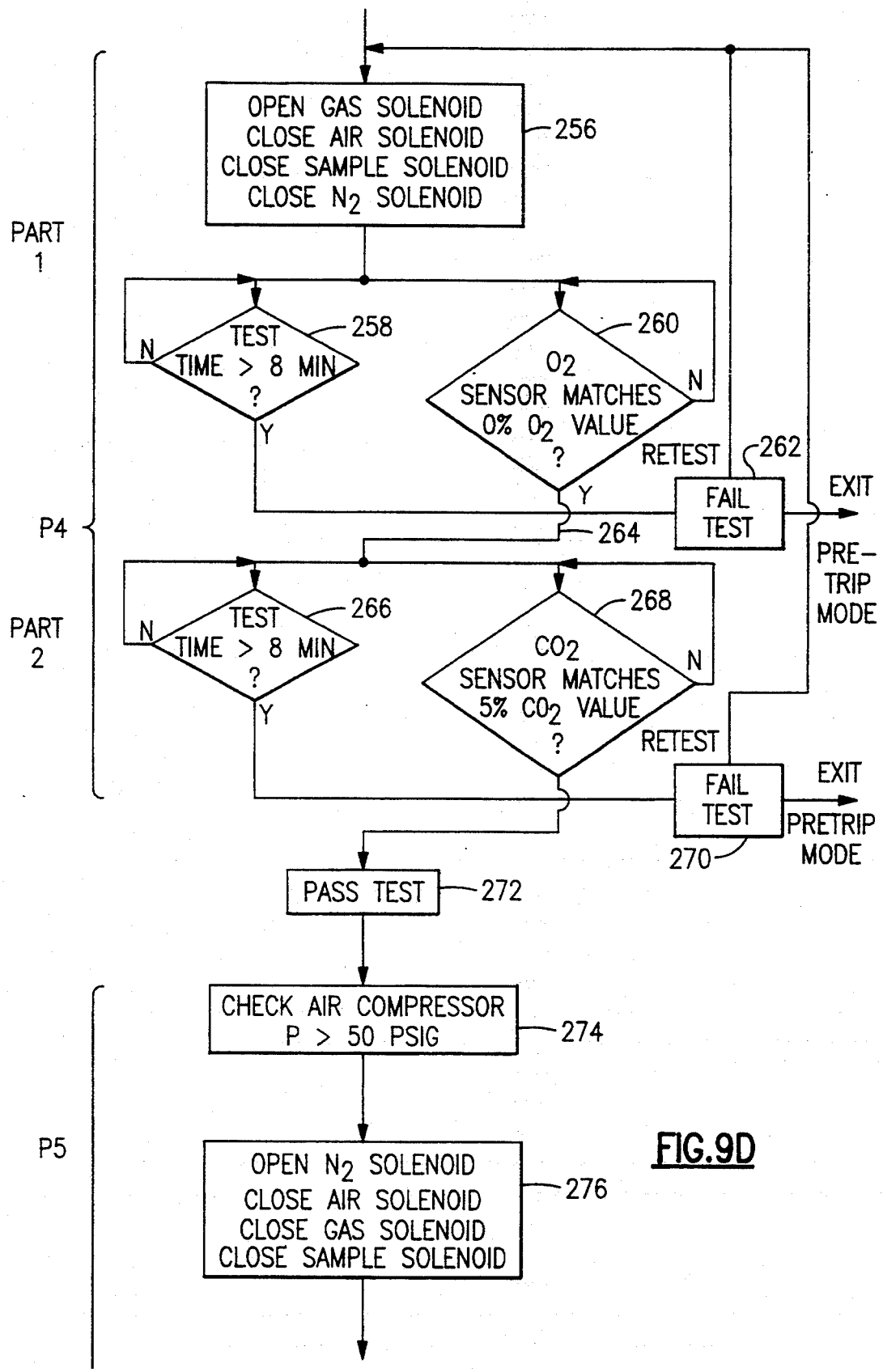

PRE-TRIP SYSTEM FOR A CONTROLLED ATMOSPHERE SYSTEM FOR A REFRIGERATED CONTAINER

FIELD OF THE INVENTION

1. Field of the Invention

The invention relates to a controlled atmosphere system for a refrigerated container and specifically to a system for regulating the amount of nitrogen, oxygen, and carbon dioxide inside a refrigerated container resulting in an atmospheric composition that extends post harvest shelf life/or quality of fruits and vegetables.

2. Description of the Prior Art

Controlled atmosphere containers for the post-harvest transport and storage of agricultural commodities are well known in the art. Such systems are usually used in conjunction with a refrigeration unit designed to lower the temperature of the interior of the container to a desired optimum temperature for the load being shipped therein. It has been established that temperature is the most important factor in controlling the rate of deterioration of fruits and vegetables. A controlled atmosphere system is considered as a supplement to proper temperature and humidity control.

The purpose of a controlled atmosphere system is to control the amount of oxygen and carbon dioxide inside the refrigerated container to change the rate of ripening of the produce stored in the container. The system controls the amount of oxygen ($O_2$) and carbon dioxide ($C_2$) by replacing them with nitrogen ($N_2$).

In early examples of controlled atmosphere systems for refrigerated containers, the modified atmosphere within the container was established, after loading, and not further modified during the period of storage or transportation. Problems with such systems included leakage both into and out of the container which changed the atmosphere. Subsequent technologies have provided for monitoring of oxygen and carbon dioxide levels within the container and have provided nitrogen and carbon dioxide sources to allow modification of the atmosphere during storage and transportation. A drawback to such systems was that supplies of carbon dioxide and nitrogen gas were required to maintain the desired atmosphere during normal lengths of transportation. Such gas sources were bulky and heavy and were not economically feasible to provide the gases required in a typical commercial application.

Systems have been developed wherein extremely high purity nitrogen gas is generated using an air separator of a type which incorporates membranes to divide a stream of ambient air, under pressure, into its principal constituents of oxygen and nitrogen. Some of such systems utilize an electronic controller to electrically operate a valve which will selectively increase or decrease the amount of nitrogen delivered from the membrane separator to the refrigerated container.

Prior to loading a container with a valuable cargo and embarking on an extended trip it is desirable to ascertain whether all of the systems and components of a controlled atmosphere system are operating correctly. In order to determine whether such a system is operating correctly, and if it is not, to determine why, requires a skilled operator. Such operator must have a complete understanding of the operation of the system and the ability to diagnose problems in order to identify the components responsible for problems. It is accordingly desirable for such a system to have a capability for assisting the operator in determining whether the system is operating properly and for diagnosing the components at fault if it is determined that it is not operating properly.

SUMMARY OF THE INVENTION

The present invention is a method for automatically checking predetermined functions and operating performance of a controlled atmosphere system for controlling the atmosphere within a confined space. The controlled atmosphere system includes an electrical control and electrically controlled components. The system includes, in serial fluid flow relationship, an air compressor, a filter having an electrically actuated drain valve, a heater, a nonelectric separator for dividing air into separate streams comprising its principal constituents of oxygen and nitrogen and two or more flow valves in parallel flow relationship for varying the purity of the nitrogen stream. The system also includes a system pressure sensor for providing the pressure upstream of the control valves.

The method, in a preferred embodiment, comprises the steps of starting the compressor, closing the drain and flow control valves, and, determining that the system pressure is greater than a predetermined value. After startup, after a predetermined delay, an initial system pressure is measured. The drain valves are then opened, and, after another predetermined delay, a final system pressure is measured, and the drain valves are closed. The difference between the initial pressure and the final pressure is then calculated. If the difference is not greater than a predetermined value the system indicates a fail test condition. If the difference is greater than the predetermined value a pass condition is indicated. The method further includes the step of determining that the system pressure is greater than a predetermined value and measuring a second initial system pressure. One of the flow control valves is then opened, and, after a predetermined delay, a second final system pressure is measured. The control valve is then closed and the difference between the second initial pressure and the second final pressure is determined. If the difference is not greater than a predetermined value a fail condition is indicated. If the difference is greater than the predetermined value the above test is repeated for each flow control valve and the pass condition is indicated when all flow control valves have resulted in a difference greater than the predetermined value.

In a preferred embodiment of the invention, applicable, when the controlled atmosphere system is provided with an oxygen sensor system and a $CO_2$ sensor system, steps are included for evaluating the accuracy and span of the sensors.

In a preferred embodiment of the invention, where the system includes two flow control valves and a fixed orifice in parallel fluid flow relationship, as well as oxygen and carbon dioxide sensors, the invention includes the steps of energizing the air compressor and determining that the system pressure is greater than a predetermined value. A flow of the gas exiting from the flow control valves is then established through the oxygen sensor whereupon both flow control valves are closed to establish a high nitrogen purity, low flow condition. The indicated oxygen output from the oxygen sensor is then compared with a predetermined expected oxygen level range and the system pressure is compared with a predetermined expected range for high pressure, low flow conditions. If the oxygen output and the pressure comparisons for high pressure, low flow conditions are within the expected ranges, one of the flow control valves is then opened to establish a medium nitrogen purity, medium flow condition. The indicated oxygen output from the oxygen sensor and the system pressure are then compared to predetermined levels for medium purity, medium flow conditions. If these conditions are met both control valves are opened to thereby establish a low nitrogen purity, high flow condition. Comparison of the indicated oxygen output from the oxygen sensor and the system pressure are then compared with the predetermined levels expected for low purity, high flow conditions. If each of the above flow and purity tests are satisfied, within a predetermined time period, a pass condition is indicated. If all of the above comparisons are not satisfied within the predetermined time period a fail is indicated.

BRIEF DESCRIPTION OF THE DRAWINGS

For a better understanding of these and other objects of the present invention, reference is made to the detailed description of the invention which is to be read in conjunction with the following drawings, wherein.

DESCRIPTION OF THE PREFERRED EMBODIMENT

Figure 1:
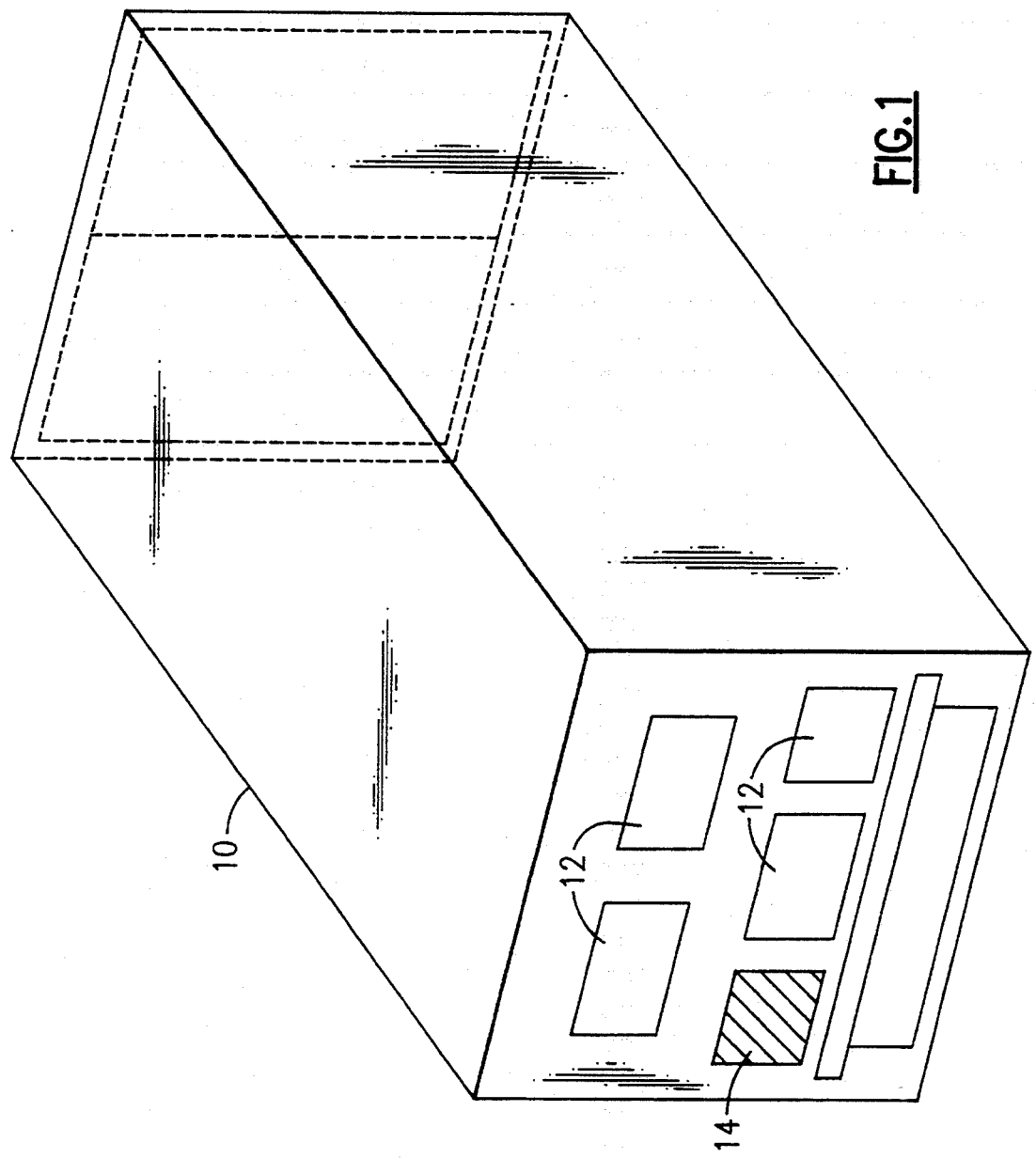
FIG. 1 is a simplified perspective view of a refrigerated transport container of the type for use with the present invention.

Referring first to FIG. 1 a refrigerated container 10 is shown which has associated therewith an integrated electrically operated refrigeration system, comprising several components 12, and, a controlled atmosphere system, a part of which 14 is shown. The refrigeration system 12 and the controlled atmosphere system are mounted at one end of the container and are adapted to regulate the temperature, and the atmosphere, respectively within the container 10.

Figure 2:
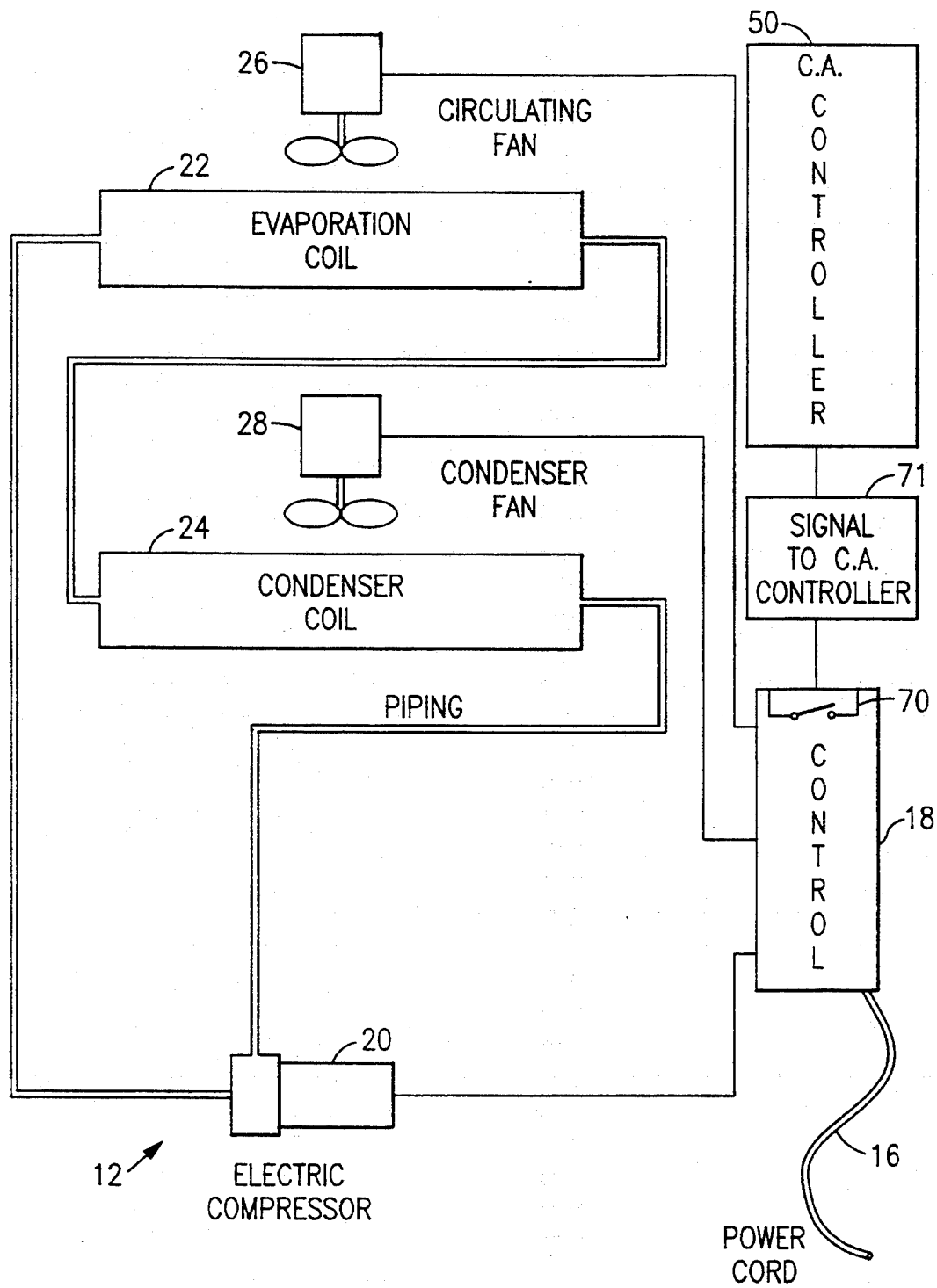
FIG. 2 is a schematic representation of a refrigeration unit of the type used in the container of FIG. 1.

With reference to FIG. 2 the refrigeration system 12 comprises a vapor compression refrigeration system which is well known in the prior art for such application. Briefly, the system includes an electrical power cord 16, providing electrical power to a refrigeration system controller 18. The controller 18 is preferably a programmed microprocessor which is adapted to receive inputs from the system operator and from various sensors in the refrigeration system and thereby control the operation of the refrigeration system components, in a manner which is well known in the art. The refrigeration system comprises a refrigeration circuit including an electrically driven compressor 20 communicating in turn with an evaporator coil 22, and a condenser coil 24. Appropriate evaporator fans 26 are provided to recirculate the atmosphere within the container 10 over the evaporator coil 22 and into the container where it is appropriately circulated and returned to the evaporator coil for further cooling, again as is conventional. A condenser fan 28 is provided to direct a cooling flow of atmospheric air over the condenser coil 24 to facilitate rejection of heat removed from the container 10. The refrigeration system controller 18 operates the various components, to maintain a selected set point temperature within the container as is conventional.

Figure 3:
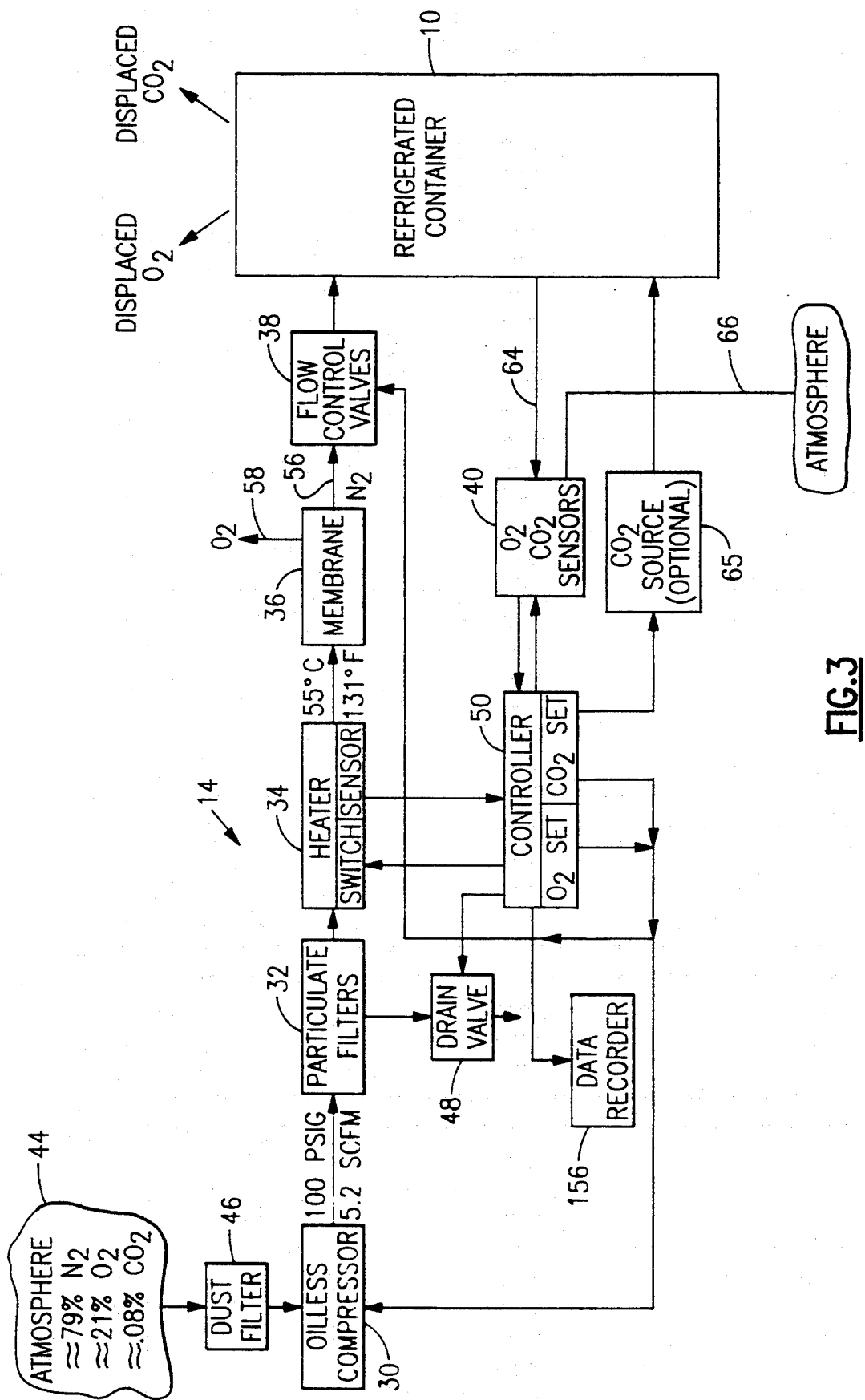
FIG. 3 is a block diagram of a controlled atmosphere system to be used in conjunction with the container unit as shown in FIG. 1.

The controlled atmosphere system 14 is illustrated in more detail in FIG. 3. The basic components of the controlled atmosphere system are an air compressor 30, a filter 32, an air heater 34, a nitrogen separation membrane 36, a system of metering valves 38, gas sensors 40 and a controller 50.

The purpose of the controlled atmosphere system is to control the amount of oxygen and carbon dioxide inside the refrigerated container 10 to change the rate of ripening of produce stored in the container. The system controls the amount of oxygen ($O_2$) and carbon dioxide ($CO_2$) by replacing it with nitrogen generated from the membrane 36.

With continued reference to FIG. 3, when the controlled atmosphere system 14 is running, air 44 from outside the container enters the compressor 30 through a dust filter 46. The atmospheric air is then compressed to a high pressure by the compressor 30. The high pressure air is then filtered by the particulate filter 32 to remove moisture and dirt before passing to the air heater 34. A normally closed drain valve 48 is provided on the filter 32. The drain valve 48 is adapted to be electrically opened when energized by the controlled atmosphere system controller 50. The controller is programmed to periodically open the drain valve 48, for a short time, to remove residue which may build up in the filter 32.

High pressure air from the filter 32 passes to the air heater 34 where it is heated to the optimum operating temperature for the membrane 36 being used in the system. As indicated in the drawing the heater output is controlled to 55° C./131° F. This is the optimum operating temperature for a membrane separator 36 available as a Model 4241 Permeator from a company known as MEDAL MEMBRANE SEPARATION SYSTEMS DUPONT AIRLIQUIDE. The controlled atmosphere controller 50 receives inputs from a temperature sensor 52 and controls energization of a heater switch 54 to maintain the temperature of the compressed air leaving the air heater.

The warmed, high pressure air passing from the heater 34 enters the membrane 36, where it is separated into high purity nitrogen, which passes from the nitrogen outlet 56, and oxygen/and other gases which are passed to the oxygen outlet 58. The rate of separation occurring in the membrane separator 36 depends on the flow of air through the membrane. This flow rate is controlled by the pressure in the nitrogen outlet 56. The higher the pressure in the nitrogen outlet 56, the higher the nitrogen purity generated, and the lower the flow rate of nitrogen. The membrane 36 is capable of generating nitrogen purity levels greater than 99 percent. As the pressure in the nitrogen outlet 56 falls, the purity level of the nitrogen falls, and the flow rate increases.

The nitrogen enriched gas passing from the membrane through the outlet 56 passes to the flow control valves 38. The oxygen/other gasses from the oxygen outlet 58 are exhausted to the outside air.

The pressure on the nitrogen outlet 56 of the membrane 36 is regulated by the aforementioned flow control valves 38. To control the percentage of nitrogen present in the container, the controller 50 is programmed to cycle the flow control valves 38 to increase or decrease the amount of nitrogen in the container as required. The controller 50 may also add $CO_2$ from an external $CO_2$ source 65 if desired.

The controller 50 monitors the amount of oxygen and carbon dioxide in the container, using oxygen and carbon dioxide gas concentration sensors 40 via a sample line 64. Periodic calibration of the $O_2$ sensor to correct drifts with time and temperature require sampling outside air via line 66.

In normal operation, following loading of the container 10, and connection of the power cord 16 to an appropriate power source the refrigeration system controller 18 is energized and programmed to a desired set point temperature for the load. At the same time the controller 50 for the controlled atmosphere system is energized and set for the desired oxygen and carbon dioxide ranges for the load.

With both the refrigeration system 12 and the controlled atmosphere system 14 energized and suitably programmed the refrigeration system will begin immediate operation according to its programmed operation. The controlled atmosphere system 14 however, will begin operation only when a controlled atmosphere enable switch 70 located in the refrigeration controller 18 is closed. The enable switch 70 is closed by the refrigeration system controller 18 when it determines that the operating conditions of the refrigeration system, and conditions within the refrigerated container 10 are such that it is acceptable to allow the controlled atmosphere machine to operate.

The system described above in connection with FIG. 3 is representative of a typical prior art system and is meant to give an understanding of the overall principals of operation of such a system. Looking now to FIG. 4 a schematic diagram of a controlled atmosphere system 14 according to the present invention as installed in a container refrigeration unit will now be described in detail. For reference purposes it should be understood that the broken lines in the schematic are used to generally define different parts of the refrigerated/controlled atmosphere refrigeration container unit and thus are useful in describing the location of various components with respect to these parts of the unit. First the enclosed portion defined by the broken line 68 on the left hand portion represent the interior of the refrigerated container box 10. The portion to the right of the interior of the box, identified by numeral 70, represents the evaporator section of the combined refrigeration/controlled atmosphere unit mounted to the end of the container. It should be appreciated that the atmosphere in the evaporator section 70 is the same as the atmosphere within the container box as the circulating fans 26 of the refrigeration unit 12 recirculate the air between these sections.

The right hand portion of the schematic as defined by the lines 72 is the condenser section of the combined container refrigeration/controlled atmosphere unit.

It will be appreciated that the condenser section 72 is in direct contact with the normal atmosphere. The condenser section 72 and the evaporator section 70 are separated by a substantially fluid tight barrier represented by line 74.

The system of FIG. 4 will be described using the reference numerals used in FIG. 3 where appropriate.

Figure 4:
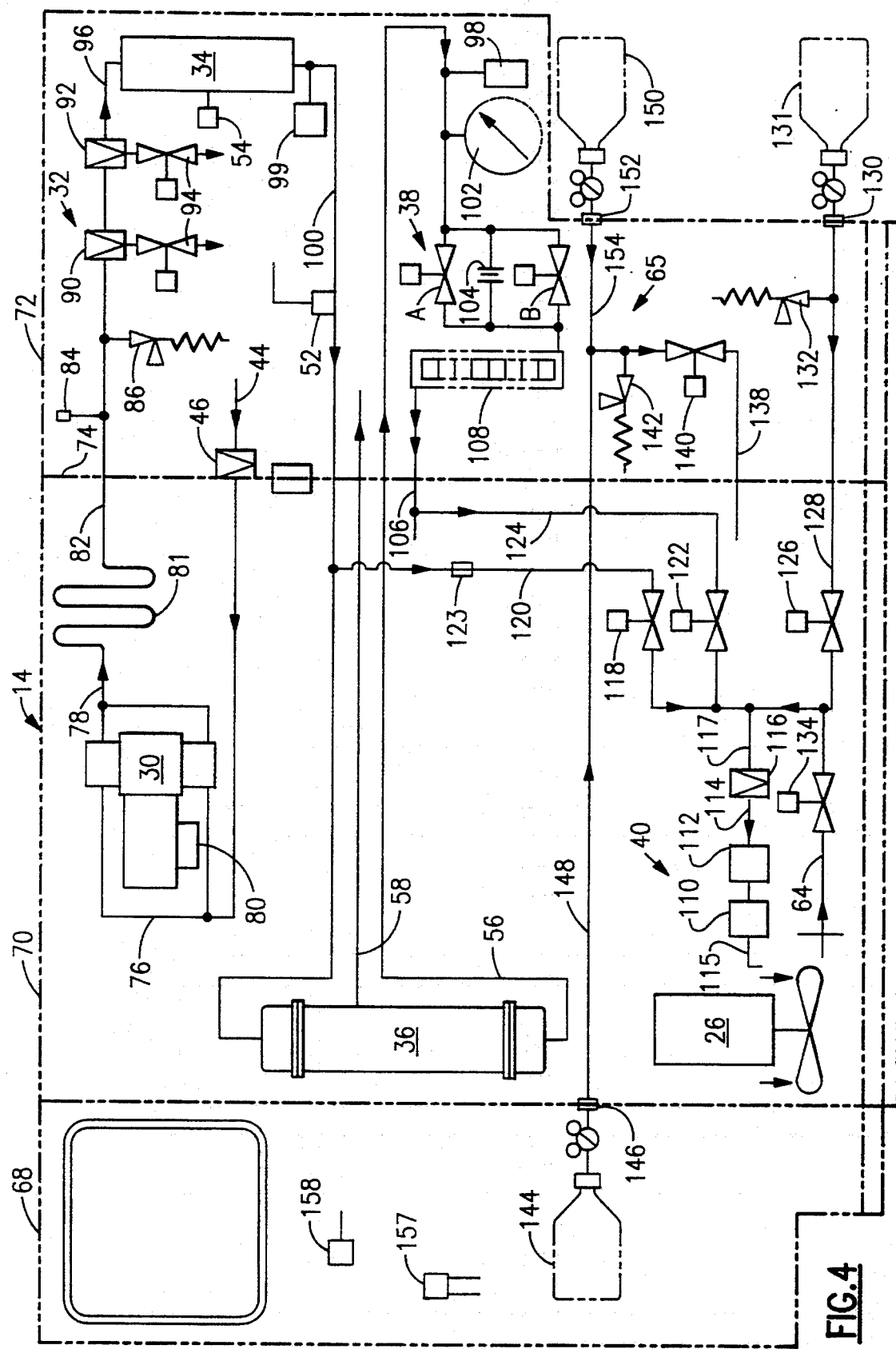
FIG. 4 is a schematic diagram of a preferred embodiment of a controlled atmosphere system of the type generally shown in FIG. 3.

Looking now at FIG. 4 in detail the intake air filter 46 is located in the condenser section 72 so as to receive outside atmospheric air 44. An appropriate inlet conduit 76 is in fluid communication with a two cylinder air compressor 30 which has an outlet conduit 78 for high pressure compressed air discharged therefrom. An over-temperature switch 80 is provided on the air compressor motor to direct a signal to the controlled atmosphere controller 50 should the compressor reach an unsafe temperature.

The outlet conduit 78 from the compressor communicates with a tortuously shaped condensing coil 81 which serves to cool the high pressure high temperature air discharged from the compressor and to condense moisture contained therein to a liquid state. From the condensing coil 81 conduit 82 passes from the evaporator section through barrier 74 into the condenser section 72. Located in the conduit 82 is a Schrader valve 84 which facilitates servicing of the system, as for example, conducting a pressurized leak check. Also located in conduit 82 is a pressure relief valve 86 designed to protect the air compressor should a high back pressure develop in the system which could damage the compressor 30.

Downstream from the pressure relief valve 86, in conduit 82, is the air filter 32 for filtering the high pressure air discharged from the compressor 30. In the preferred embodiment this filter is actually two separate filters, a primary discharge air filter 90 for large contaminants and a secondary discharge air filter 92 for fine particulate contaminants. Each of the filters 90 and 92 is provided with a filter media which is replaceable on a periodic schedule. Each filter 90, 92 is also provided with a drain solenoid valve 94. These electrically operated valves are normally closed and are adapted to be opened by the controlled atmosphere controller 50 on a periodic schedule, for a short period of time, to remove residue built up in the filters.

Conduit 96 communicates the outlet of filter 92 with the inlet of the air heater 34. As previously discussed the air heater is controlled by the system controller 50 to maintain the optimum temperature for the membrane separator 36 utilized in the system. Heater operation is controlled by the system controller by way of a program which uses inputs from the desired set point temperature and from an air temperature sensor 52 which is located in the conduit 100 which communicates the outlet of the air heater 34 with the inlet of the membrane 36. Air heater temperature control inputs from the controller 50 cycle the heater on/off switch 54 located adjacent to the heater. An air heater over temperature safety switch 99 is provided to interrupt power to the heater 34 if the temperature exceeds a predetermined safe level.

As previously described the membrane separator 36 has an oxygen outlet 58 which extends from the separator through the barrier 74 to discharge oxygen and other gases to the outside atmosphere. The nitrogen outlet 56 also extends through the barrier 74 into the condenser section 72 where it communicates with the flow control or metering valve system 38. Located in the nitrogen outlet conduit 56 is a pressure transducer 98 which provides a pressure input signal to the controlled atmosphere controller 50. An air pressure gage 102 is also illustrated in the nitrogen outlet line 56 to provide a visual reading of nitrogen pressure in the outlet line 56.

The flow control valve system 38 comprises three separate metering devices arranged in a parallel fluid flow relationship. These devices cooperate to control the flow of nitrogen to a nitrogen delivery line 106 which passes through the barrier 74 into the evaporator section 70. The nitrogen delivered by line 106 is then circulated by the circulating fans 26 of the refrigeration system to the interior 68 of the container box 10. A flow meter 108 is shown in the nitrogen delivery line which will provide a visually perceptible reading of the nitrogen flow from the flow control valve system 38 to the container.

The flow control valve system 38 comprises two solenoid valves designated A and B and a fixed orifice 104, which in the preferred embodiment is a capillary tube. The flow control solenoid valves A and B are normally closed and are selectively opened and closed in response to the control algorithm from the controlled atmosphere system controller 50 to adjust the purity of nitrogen generated by the membrane 36.

In the preferred embodiment, with both valves A and B open, flow is through all three metering devices and the membrane will produce an output of approximately 15 percent oxygen and 85 percent nitrogen. This is defined as the low purity, high flow condition. With one valve, (A or B) open the system will produce approximately 5 percent oxygen and 95 percent nitrogen. This is defined as the medium purity, medium flow condition. With both valves A and B closed, the system will produce approximately 0.5 percent oxygen and 99.5 percent nitrogen. This is defined as the high purity, low flow condition. As will be seen the control algorithm for the system uses oxygen value as its primary control input.

Also located in the evaporator section 70 above the circulating fan 26, are the gas sensors 40. The sensors include an oxygen sensor 110 which is used to measure the concentration of oxygen inside the container. The oxygen sensor used in a preferred embodiment of the system is a galvanic fuel cell. When a gas sample is passed through the galvanic cell, oxygen reacts with the cell to produce a small voltage. The voltage output is directly proportional to the oxygen concentration. The controller 50 converts the voltage output to a percent oxygen readout on the digital display which will be described hereinbelow. A model KE-50C Galvanic cell oxygen sensor available from the Japan Storage Battery Company, Ltd. is used in a preferred embodiment of the system. Also included is a $CO_2$ sensor 112 which is used to measure the concentration of carbon dioxide inside the container. The $CO_2$ sensor is what is known as a non dispersive infrared (NDIR) microbench $CO_2$ sensor, available as part number 032 from Sensors Inc. The $CO_2$ sensor 112 has an internal temperature sensor which generates a signal which is also delivered to the controller. The sensor generates a signal which is converted by the controller 50 to a percent $CO_2$ readout on the digital display. The $O_2$ and $CO_2$ sensors 110, 112 are in serial fluid flow relationship in a gas sampling line 114. Down stream from the sensors is a discharge line 115 open to the evaporator section of the unit, while upstream is a gas sample filter 116.

Four electrically actuated solenoid valves may be selectively actuated to provide the desired gas sample flow to the inlet line 117 to the sensors 40. A first solenoid valve 118 is located in an air sample line 120 which is adapted to deliver a sample of the warm air from the inlet line 100 to the membrane 36. A capillary tube or other suitable pressure drop device 123 is provided in this line as the air supply line is at high pressure.

A second solenoid valve 122 is positioned in a nitrogen sample supply line 124 which communicates with the nitrogen delivery line 106. A third solenoid valve 126 is located in a calibration gas delivery line 128. The calibration gas delivery line communicates with a suitable gas fitting 130 located on the outside of the condenser section 72. It is adapted to be connected with a calibration gas tank 131 which contains a calibration gas made up of 5 percent $CO_2$ and 95 percent nitrogen. For safety purposes a pressure relief valve 132 is provided in the calibration gas line 128. Finally the fourth solenoid valve 134 is located in the sample line 64 which is adapted to deliver a sample of the gas within the container 10 to the gas sensors. It should be appreciated that each of these solenoid valves is selectively actuated by the controlled atmosphere system controller 50. In a like manner, the outputs from the $O_2$ sensor 110 and the $CO_2$ sensor 112 are delivered to the system controller to monitor the operation and performance of the system as will be appreciated.

With continued reference to FIG. 4 the system is provided with a $CO_2$ supply system previously identified by reference numeral 65. The system includes a $CO_2$ delivery line 138 which has a normally closed electrically actuated solenoid valve 140 positioned therein. A pressure relief valve 142 is also provided in the $CO_2$ supply line 138. In the illustrated embodiment two locations for $CO_2$ supply bottles are shown. The first is in the interior 68 of the container box wherein a $CO_2$ bottle 144 is shown in communication with an appropriate fitting 146 and a supply line 148 to the $CO_2$ system. A second $CO_2$ bottle 150 located outside of the entire unit communicates through a fitting 152 and a line 154 to the $CO_2$ system 65.

The $CO_2$ supply system 65 is physically separate from the rest of the controlled atmosphere system and is actuated as needed by the control atmosphere controller 50 by actuation of the solenoid valve 140. Located within the interior 68 of the container 10 is a door safety interlock solenoid 156. This solenoid is associated with an interlock mechanism which will prevent the doors of the container form being opened when the oxygen level in the container falls below a predetermined value.

In order for the integrated refrigeration/controlled atmosphere system to operate according to the present invention it is necessary that the controller 18 of the refrigeration system and the controller of the controlled atmosphere system 50 be able to communicate electronically with one another. One example of such communication is the over riding control of the refrigeration controller 18 by the enable switch 70, briefly described hereinabove which is the subject of a co-pending application. This relationship between the controllers 18 and 50 is shown schematically in FIG. 5 wherein the solid arrows 155 interconnecting the controllers and electronic data recorder 156 are meant to illustrate the ability of these components to electronically communicate with one another. The data recorder serves to periodically record, for future reference, information from both the refrigeration controller and the controlled atmosphere controller. Information recorded from the refrigeration controller typically includes temperature of supply and return air being circulated. Information recorded from the controlled atmosphere controller includes $O_2$ and $CO_2$ levels, the result of the pre-trip tests, alarm activity, and the state of the enable switch 70.

Figure 6:
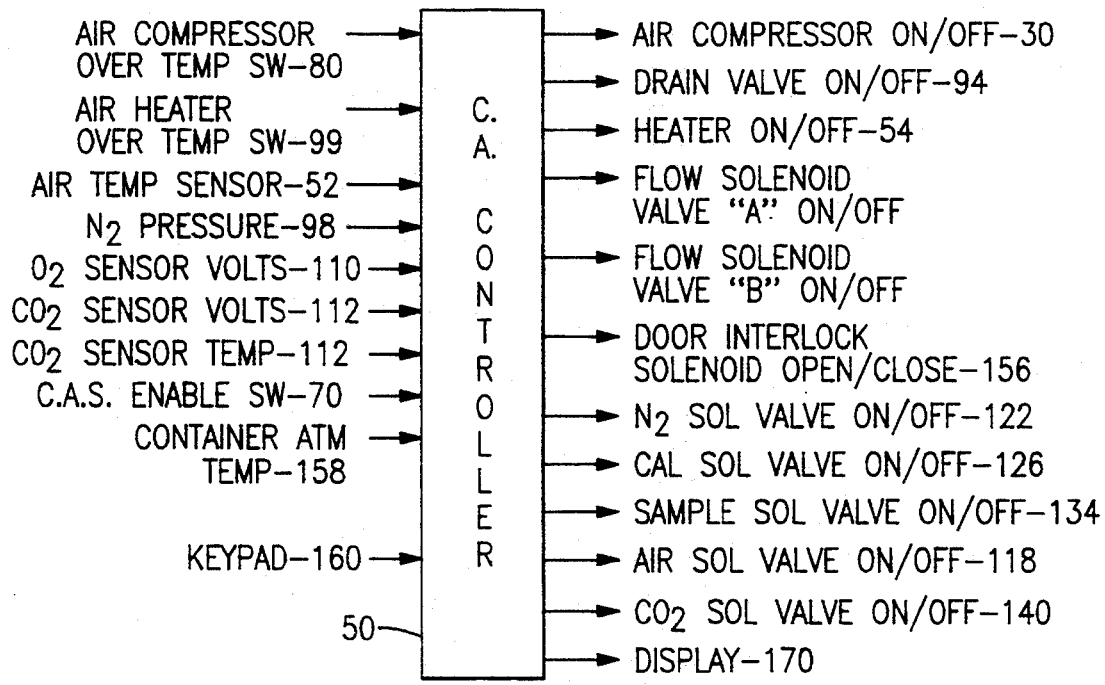
FIG. 6 is a representation of the controlled atmosphere controller showing the inputs and outputs as they relate to the system illustrated in FIG. 4.

For convenience in understanding the role of the controlled atmosphere controller 50 in controlling all of the components of the system illustrated in FIG. 4 FIG. 6 generally illustrates the controller 50 and the inputs and outputs thereto/therefrom. Each of the inputs is identified and the corresponding reference numeral in FIG. 4 is also used. The container atmosphere temperature input is derived from a temperature sensor 157, not previously mentioned, located within the enclosed space 68 of the container 10. The key pad 160 inputs will be described below in connection with FIG. 7. All of the other inputs have been discussed above in connection with the description of the system shown in FIG. 4.

The outputs from the controlled atmosphere controller 50 are likewise each described along with the relevant reference numeral used in FIG. 4. Again each of these components has been described previously and will not be further elaborated upon at this time.

Figure 7:
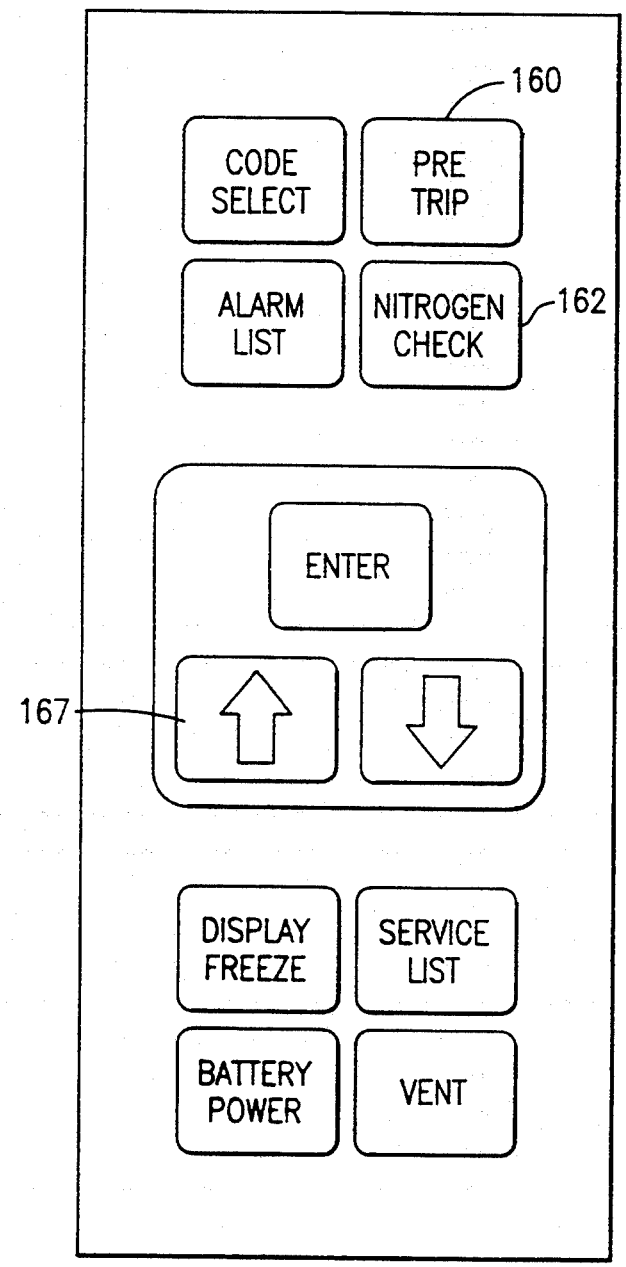
FIG. 7 illustrates the appearance of the input keypad for the controlled atmosphere controller of the present invention.

FIG. 7 illustrates the appearance of the key pad 160 which provides operator inputs to the controller 50. Most of the input buttons on the key pad 160 are not necessary to an understanding of the present invention and will not be described herein. As will be seen the pre-trip button 166 and the "up" arrow button 167 will facilitate an understanding of the invention.

Figure 8:
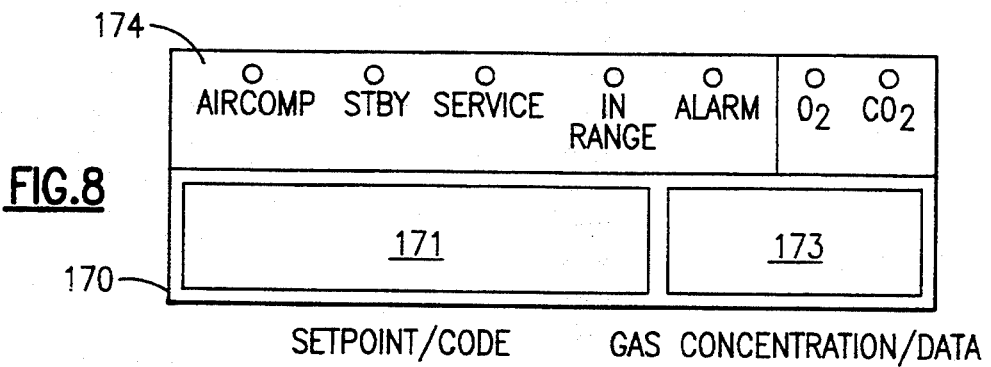
FIG. 8 is an illustration of the display associated with the controlled atmosphere controller.

FIG. 8 represents the display 170 of the controlled atmosphere controller 50. Across the top of the display are a series of seven indicator lights 174 useful in conveying information to the operator during operation of the system. At the bottom of the display are two alphanumeric LCD visual display regions. The left hand display 171 and the right hand display 173 will be useful as will be appreciated in understanding the operation of the pre-trip mode of operation.

As discussed above the controlled atmosphere system 14 is controlled by a microprocessor controller 50 which through appropriate electrical controls, including relays and the like operate the various electrical components of the system. To assure correct operation of the above system, before relying on the system to control the atmosphere of an expensive load of produce, it is important to check the operation of the system and its components. Rather than relying upon a trial run of the system or the operators expertise in diagnosing potential problems the microprocessor of the controller 50 has been programmed with a pre-trip mode of operation.

In order to initiate a pre-trip mode, the operator presses the pre-trip key 160 on the controlled atmosphere system keyboard 162.

Figure 5:
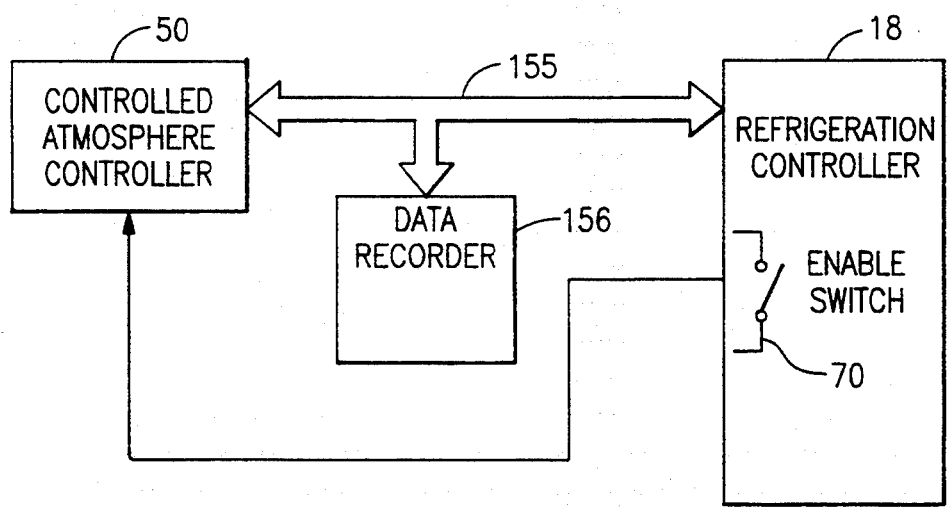
FIG. 5 is a block diagram showing the relationship between the controllers of the refrigeration and controlled atmosphere system.
Figure 9B:
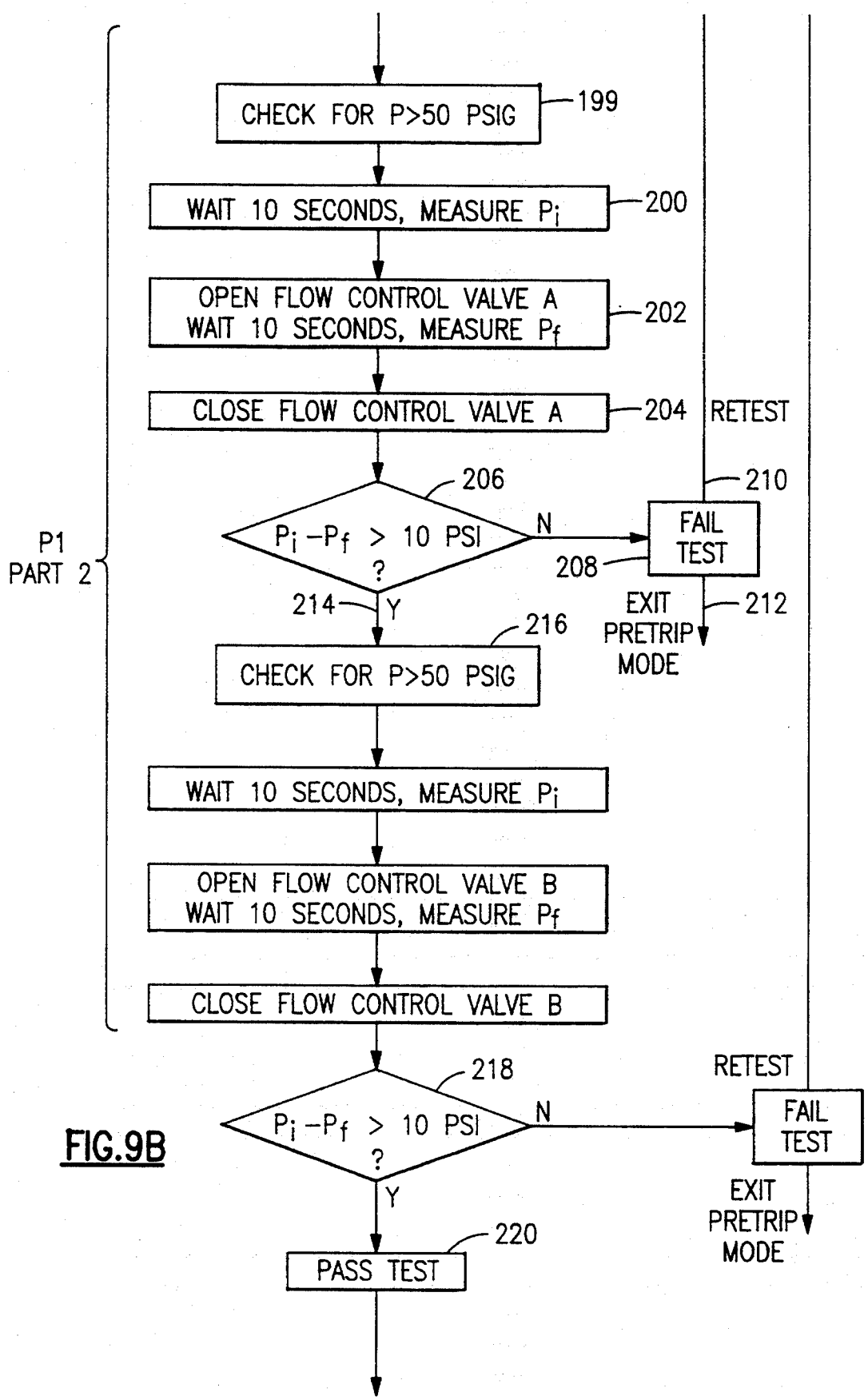
FIGS. 9-E comprise a flow chart of a software program residing in the microprocessor of the controlled atmosphere controller which performs an automatic self-test of all system functions prior to system operation.

Looking now to FIG. 9A following pressing of the pre-trip key 160 the controlled atmosphere controller 50 determines at step 166 that the key has been pressed and goes into the pre-trip mode. Before initiating pre-trip tests, at step 168, the controller 50 informs the refrigeration system controller 18, that it is in "pre-trip", by way of electronic communication (as shown in FIG. 5) to prevent the refrigeration system 12 from going into a defrost or dehumidification activity during pre-trip and thus disturbing the pre-trip test. Also in step 168 the door safety interlock solenoid 156 is energized. The system then enters its pre-trip mode of operation wherein it performs a series of automated tests, and displays the results of the tests on the controlled atmosphere system display 170.

Basically, if each test passes, the pre-trip algorithm moves on to the next test in the series, until all tests are passed, at which time the controlled atmosphere system returns to its normal control mode. If a test fails and it is the first failure the controller will automatically conduct a retest. If a test fails a second or subsequent times the failure result is displayed on the controlled atmosphere display 170, and the failure message is sent to the data recorder 158. The operator must then correct the problem or manually exit from the pre-trip mode. Manual exit is achieved by pressing the pre-trip key 160 and holding it pressed for at least 5 seconds. The controlled atmosphere 50 will then send a message to the refrigeration controller 18 that it is out of its pre-trip mode. The refrigeration and controlled atmosphere systems will then return to their normal modes of operation.

During the pre-trip mode of operation the left part 171 of the display 170 which normally displays set points and/or error codes indicates the test that is being performed. Likewise during pre-trip the right hand display 173, normally displaying gas concentration data indicates the time remaining in the test that is being conducted and eventually the results of the test, i.e. pass or fail. As will be noted with reference to FIGS. 9A through E the tests are identified as P0, P1, P2, P3, P4 and P5. Several of the tests have two parts and anytime during a part of a test that a "failed test" indication is received, and the operator elects to retest, the system automatically goes back to the beginning of the first part of the test being run.

Looking back at FIG. 9A in test P0 at step 172 the controller turns on all the indicator lights 174 and the display segments 171, 173 on the controlled atmosphere controller display panel 170. The controller then, at step 176 turns off all the indicator lights and display segments for a period of three seconds. This test must be visually observed by the operator who will determine if the test passes or fails. Assuming the test passes and the operator does not manually exit the pre-trip mode the system automatically moves to step 182 where it starts the controlled atmosphere air compressor 30, and checks to see that the system pressure is greater than 50 psig. The system pressure as measured in this step and in other steps is that provided by the pressure transducer 98 in the nitrogen outlet line 56.

Test P1 begins at step 184 by closing both drain valves 94 and both flow control valves A and B. After closing both sets of valves the controller waits 10 seconds and determines the system pressure and identifies this as $P_i$. Following this, at step 186 the system opens both drain valves 94, waits 10 seconds and again measures the system pressure to determine a final pressure $P_f$. The drain valves are closed at step 188 and at step 190 it is determined whether $P_i$ minus $P_f$ is greater than 15 psi. If the answer is "NO" the system moves to "fail test" at 192. At this point the controller 50 suspends the pre-trip test and displays "P1 Part 1" on display segment 171, and "FAIL" on display segment 173. The operator may then elect to "retest" via branch 194 or may manually exit from pre-trip mode at 196 as described above.

If $P_i$ minus $P_f$ is greater than 15 psi the "Yes" branch of step 190 is followed and a "Pass Test" 198 is displayed. The controller then moves on to part 2 of the P1 test at step 199 where it again checks to assure the system pressure is greater than 50 psig. When the system pressure requirement is met the controller than waits 10 seconds and assigns a new initial pressure $P_i$ at step 200. Following this, at step 202, flow control valve A is opened for 10 seconds and a new final pressure $P_f$ is measured. Flow control valve A is then closed at step 204 and at step 206 a comparison of the new final pressure and initial pressure is made to determine if $P_i$ minus $P_f$ is greater than 10 psi. If this condition is not satisfied a "Fail Test" indication, 208 will be displayed as described above. The operator may then elect retest 210 or exit 212 as described above.

If the pressure differential test 206 is satisfied for control valve A the "Yes" branch 214 is followed and the controller checks system pressure again at step 216 to determine that it is greater than 50 psig. At this time the system then runs through a test of flow control valve "B" making the same inquires and decisions as described above in connection with flow control valve A. If flow control valve B satisfies the initial and final pressure comparison at step 218 the system moves through the yes branch 218 and the "pass test" indication 220 is display.

Figure 9C:
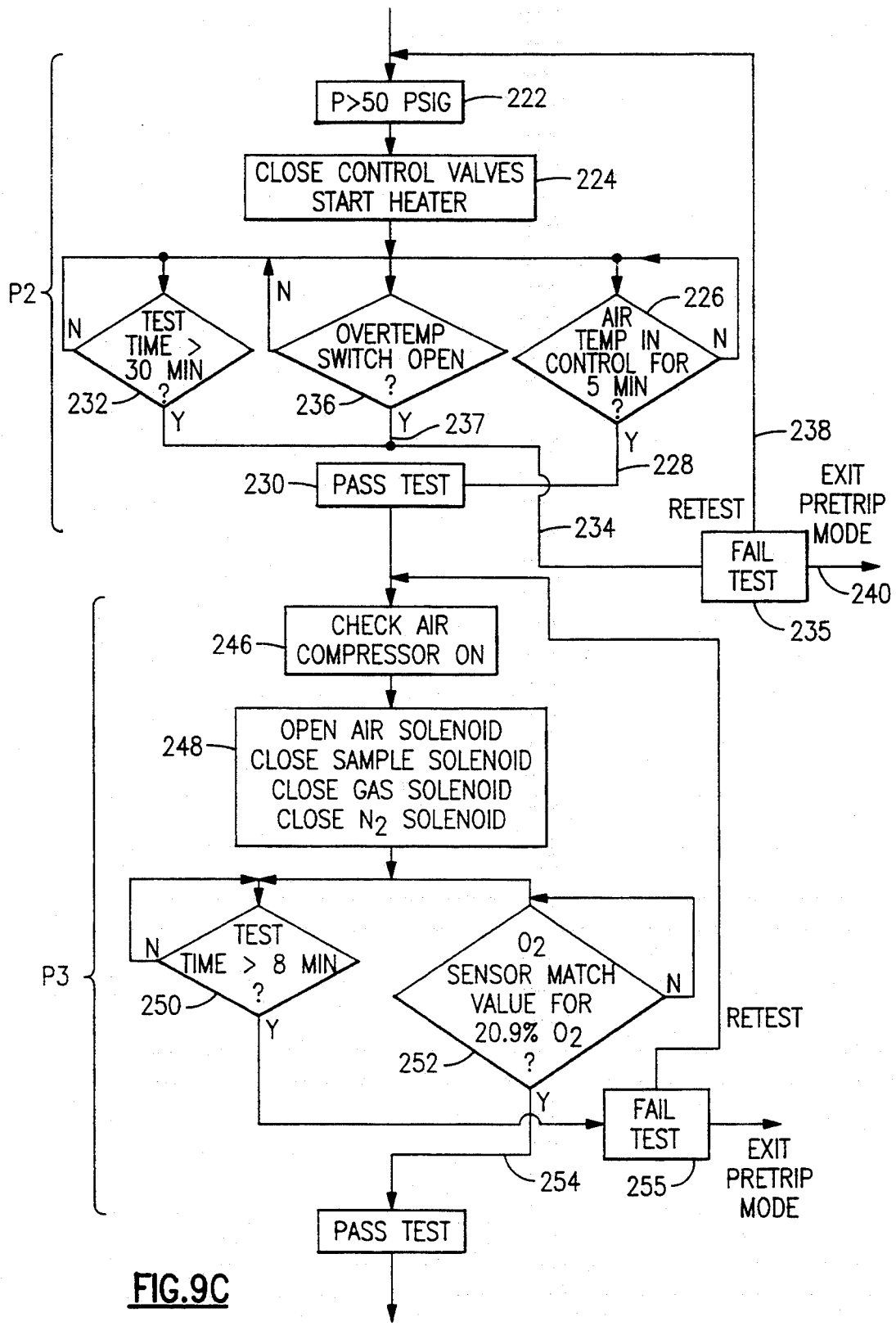

Referring now to FIG. 9C the controller then moves on to evaluate the operation of the air heater 34 and related control components. With reference to step 222 the air compressor 30 must be operating and delivering a pressure of greater than 50 psig to the system pressure transducer 98 before this test will be initiated. With this condition satisfied the system closes both of the drain valves 94 and both of the flow control valves A and B. These valves are collectively identified as "control valves" in step 224. Following closing of all of these valves the air heater 34 is energized.

Three separate inquiries are then carried out in parallel by the controller. First at step 226 the temperature of the air leaving the air heater 34, as sensed by the air temperature sensor 52 is compared to the desired heater exit set point temperature. If the heater exit temperature is found to be within the set point temperature by a predetermined value (in the illustrated embodiment ±3° C.) for a period of five minutes the controller will move through the Yes branch 228 and the controller will indicate "Pass Test" 230 on the display 173. Referring now to step 232 it will be noted that a 30 minute timer is initiated at the beginning of the heater test. As a result, if during this 30 minute time, the heater is not brought into the desired control for five minutes then the test time becomes greater than 30 minutes the test fails and the controller will, via the Yes branch 234 show a "Fail" 235 on the display 173.

During the duration of the heater test the status of the heater over temperature switch 99 is monitored by the controller at 236. If during the test the over temperature switch opens the heater test will fail and display via the Yes branch 237 a "Fail" result on the display 173. Again the operator options are, from "Fail Test" 235 retest 238, or manual exit from the pre-trip mode 240.

With continued reference to FIG. 9C, assuming a "Pass Test" result 230 on the heater test the controller moves to P3 the Oxygen Sensor Span Test. As previously noted, the oxygen sensor 110 produces a small voltage output which is directly proportional to the oxygen concentration of the gas it is sensing. The microprocessor of the controlled atmosphere controller 50 converts the voltage output to a percent oxygen readout which is shown on the digital display 173. The microprocessor is programmed with the sensor specifications for a range of oxygen measurements from zero to 20.9 percent and the expected voltage reading for this range of oxygen levels. The span of the oxygen sensor is defined as the difference between the voltage reading from the oxygen sensor at its maximum level less the reading at its minimum level. With time and temperature changes the oxygen sensor is expected to deteriorate and the span may decrease to the point where the sensor is not capable of producing a voltage output which matches the sensor specification for 20.9 percent oxygen.

Accordingly, in the P3 oxygen sensor span test the microprocessor first checks at step 246 to assure that the air compressor is on and thus a flow of outside air will be available for testing. Outside air reliably contains 20.9 percent oxygen and is thus readily available for use in making this determination. The microprocessor then, opens the air sample solenoid 118, and closes the sample solenoid 134, the calibration gas solenoid 126, and the nitrogen solenoid 122, as indicated at step 248. With the solenoid valves so set the span test is initiated with an eight minute timer 250 running in parallel with a comparison step 252. At step 252 the voltage output of the oxygen sensor, with atmospheric air containing 20.9 percent passing therethrough, is compared to the sensor specification as stored in the controller for 20.9 percent oxygen. If the match is made the controller moves through the "Yes" branch 254 to indicate "pass test" on the display 173. If the match is not made within the eight minute period set by the timer 250 the test will fail as shown at 255 and the usual options are available to the operator.

Looking now a FIG. 9D upon completion of the oxygen sensor span test the controller moves to step P4 the "calibration gas test" wherein a calibration gas comprising 5 percent carbon dioxide and 95 percent nitrogen is used to determine the oxygen sensor 0% point in part one, and, the carbon dioxide sensor span in part 2. This test requires a supply of calibration gas of 5 percent $CO_2$, and 95 percent $N_2$ to be connected to the calibration gas fitting 130. The oxygen sensor 0% point test is initiated by opening the calibration gas solenoid valve 126 and closing each of the air solenoid valve 118, the nitrogen solenoid valve 122 and the sample solenoid valve 134 as indicated at step 256. The test is similar to the oxygen sensor span test described above, with an eight minute timer 258 running and a comparison 260 running in parallel. In the comparison step the controller 50 attempts to match the value from the oxygen sensor (with the calibration gas, which contains no oxygen, being sensed) to the $O_2$ sensor specification for 0% oxygen which has been programmed into the controller. If this condition cannot be met, during the eight minute time limit 258, the test fails 262. If the match is made the controller moves through the "Yes" branch 264 to the Carbon Dioxide Sensor Span Test (P4 Part 2) which will check if the span of the $CO_2$ sensor matches the sensor specification programmed into the controller 50 for gas containing 5% $CO_2$. During this test the solenoid control valves which control the flow to the sensors are set the same as for P4 Part 1 as set forth in step 256.

As with the oxygen sensor 0% point test two tests are running in parallel, an eight minute timer 266, and, a $CO_2$ sensor comparison 268. In the comparison step the controller 50 attempts to match the value from the $CO_2$ sensor (with calibration gas containing 5% $CO_2$ passing through the $CO_2$ sensor) with the specification for 5% $CO_2$ gas as programmed into the controlled atmosphere system controller 50. The test will Pass 272 if the comparison 268 results in a span output of the $CO_2$ sensor which matches the sensor specification for 5% $CO_2$. If the output of the $CO_2$ sensor does not match the specification within eight minutes of the start of the test as determined by the timer 266 the test will fail, 270 and the operator will have the usual options.

With continued reference to FIG. 9D, upon successful completion of the calibration gas test and display of a "Pass" result on the display 173 the controller 50 moves automatically to the "P5" Nitrogen Flow Test. These tests are used to determine if the membrane assembly 36 is functioning properly and thereby producing the required purity of nitrogen. Following this test the carbon dioxide sensor 112 is also tested, in P6, to determine if its "zero point" may be set using the high purity generated nitrogen.

Preliminary steps before initiation of the tests include at step 274, checking to assure that the CA air compressor 30 is operating and delivering a pressure of at least 50 psig to the system pressure transducer 98. When this has been verified, at another preliminary step 276, the controller sets the gas control valves to deliver a nitrogen sample to the sensors by opening the nitrogen solenoid valve 122, and closing the air solenoid valve 118, the calibration gas solenoid 126 and the sample solenoid valve 134. The controller then proceeds to initiate a series of three tests which evaluate the capability of the membrane 36 to produce nitrogen at different purity levels.

As previously described the rate of separation in the membrane 36 depends on the flow rate of air through the membrane, the flow rate being controlled by the pressure in the nitrogen outlet line 56. The higher the pressure in the nitrogen outlet 56, the higher the nitrogen purity generated, and the lower the flow rate. Conversely, as the pressure in the nitrogen outlet falls, the purity level of the nitrogen falls and the flow increases. The purity of the nitrogen is determined by measuring the oxygen level in the nitrogen enriched gas passing from the membrane in the nitrogen outlet line 56. With the solenoids set as in step 276 a sample of the gas from the nitrogen outlet 56 is delivered to the oxygen sensor 110.

Accordingly, the purity of the nitrogen passing from the membrane is determined by measuring the level of oxygen present in the gas passing from the nitrogen outlet 56 of the membrane.

Figure 9E:
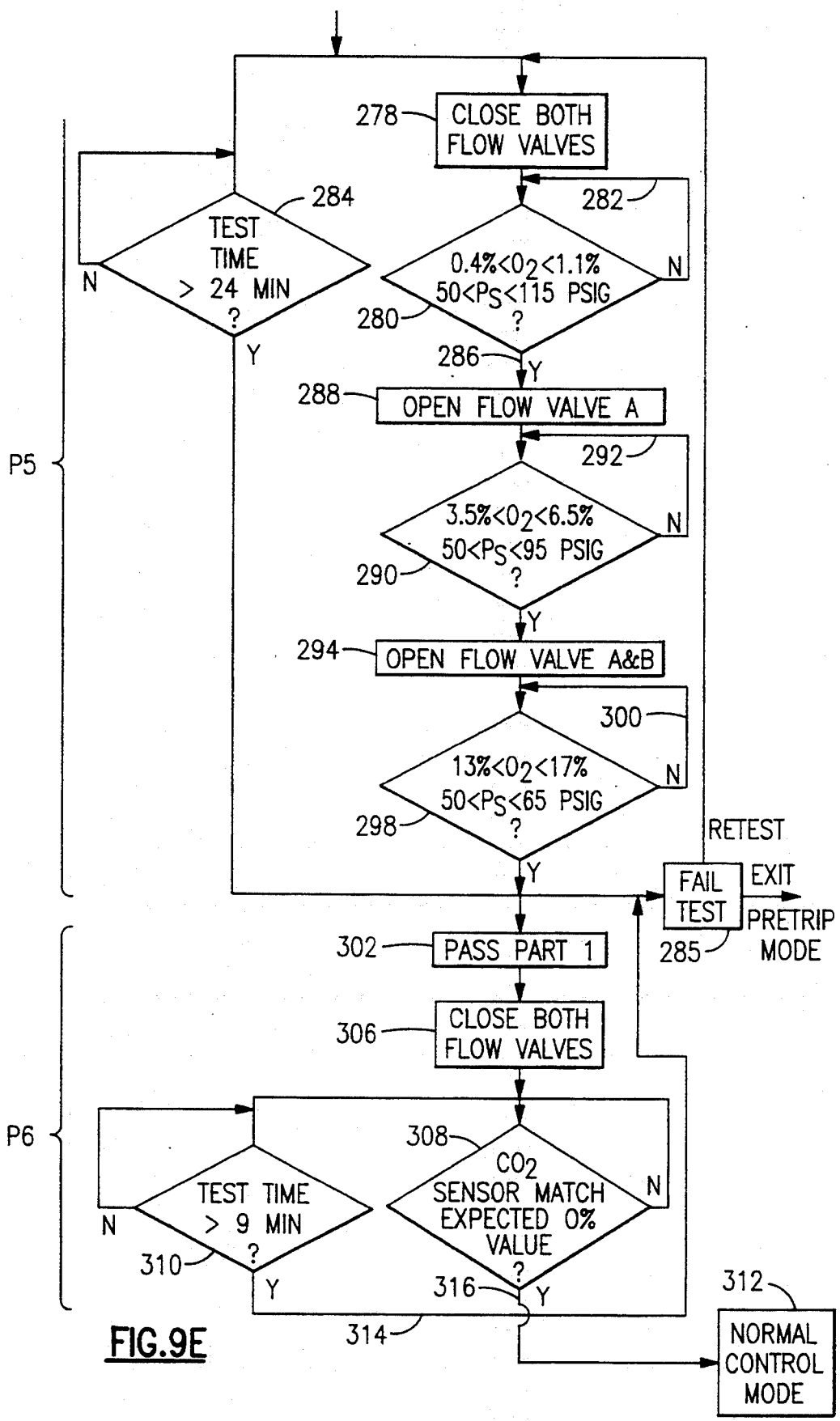

With reference now to FIG. 9E, a 24 minute timer 284 begins running, following preliminary steps 274,276, upon initiation of the purity tests. If all purity tests are not satisfied before the timer expires the system fails the test, 285. The "high nitrogen purity test" is initiated at step 278 by closing both flow control valves A and B. The controller 50 then interrogates the outputs from the oxygen sensor 110 and the system pressure transducer 98 (at step 280) until it determines that, the oxygen output falls within the range of 0.4 percent to 1.1 percent and the system pressure $P_5$ falls within the range of 50 to 115 psig. If not satisfied this inquiry continues via the "No" branch 282 or until the timer 284 expires and the system fails the test 285.

If the high nitrogen purity test conditions 280 are satisfied the controller moves through the "Yes" branch 286 and opens flow valve A at step 288 to reduce the back pressure on the membrane 36 and accordingly increase the flow and reduce the purity of the nitrogen stream. The controller then again interrogates the oxygen sensor 110 and the system pressure transducer 98 until medium nitrogen purity conditions as shown in step 290 are satisfied. These conditions require an oxygen level between 3.5 and 6.5 percent and a system pressure between 50 psig and 95 psig. This inquiry continues via the "No" branch 292 until satisfied or until the timer 284 expires.

Assuming the medium nitrogen purity test conditions 290 are satisfied the controller moves to step 294 and opens both flow control valves A and B to thereby further reduce the back pressure on the membrane, increase the flow therethrough and reduce the purity of the nitrogen passing through the outlet 56. With the valves set in this manner the low nitrogen purity test comparison as indicated by step 298 is carried out wherein the controller looks for the oxygen level to fall within the range of 13 percent to 17 percent oxygen and for the system pressure to lie between 50 and 65 psig. As with the high and medium nitrogen purity tests the controller will continue to look for these conditions via the no branch 300 until they are satisfied or until the timer 284 expires.

If the low purity nitrogen test 298 is satisfied prior to the timer 284 expiring the nitrogen purity test will pass via the Yes branch and the display 173 will indicate "Pass" 302. If of course the three nitrogen purity tests are not completed during the 24 minute run of the timer 284, the system is not operating properly and will indicate via the Yes branch of the timer 284 a "fail test" on the display 170. The operator then has the usual options available.

Upon successful completion of the P5 nitrogen flow test the controller will move to P6 the $CO_2$ sensor zero point test, at step 306, and close both of the nitrogen flow control valves A and B to result in a high purity nitrogen flow from the membrane. This high purity nitrogen is directed to the carbon dioxide sensor 112. The output from the carbon dioxide sensor is directed to the system controller 50 where it is compared, at step 308 with the 0% specification of the carbon dioxide sensor which has been programmed into the controller. A nine minute timer 310 is running concurrently with this comparison. If the $CO_2$ sensor match is not achieved during the nine minute period the test will move via the "Yes" branch 314 to "fail test" 285 where the usual options are available to the operator. If the zero point specification comparison is met within the nine minute time period the system will pass via the "Yes" branch 316 and display "Pass" on the display 173. At this time, the controlled atmosphere controller 50 will terminate the pre-trip mode of operation will send a message to the refrigeration controller 18, and to the data-recorder 156 that the controlled atmosphere system has passed pre-trip tests and has exited from the pre-trip mode. The controlled atmosphere system, as well as the refrigeration system will then return to their normal operating modes as represented generally at 312.

What is claimed is:

1. A method for automatically checking predetermined functions and operating performance of a controlled atmosphere system for controlling the atmosphere within a confined space, the system having an electrical control and electrically controlled components, including, in serial relationship, an air compressor, a filter having a drain valve, a heater, a nonelectric separator for dividing air into separate streams comprising its principal constituents of oxygen and nitrogen, two or more flow control valves in parallel flow relationship for varying the purity of the nitrogen stream, and including a system pressure sensor for providing the pressure upstream of the control valves; comprising the steps of:

(a) starting the compressor;
(b) closing the drain valves and the flow control valves;
(c) determining that the system pressure is greater than a predetermined value;
(d) after a predetermined delay measuring an initial system pressure;
(e) opening the drain valve;
(f) after a predetermined delay measuring a final system pressure;
(g) closing the drain valve;
(h) calculating the difference between the initial pressure of step (d) and the final pressure of step (f), and, if the difference is not greater than a predetermined value, indicating a fail condition, if the difference is greater than said predetermined value indicating a pass condition;
(i) again, determining that the system pressure is greater than a predetermined value;
(j) after a predetermined time measuring a second initial system pressure;
(k) opening one flow control valve;
(l) after a predetermined delay, measuring a second final system pressure;
(m) closing said one flow control valve;
(n) calculating the difference between the second initial pressure of step (j) and the second final pressure of step (l), and, if the difference is not greater than a predetermined value indicating a fail condition, if the difference is greater than a predetermined value, repeating steps (i) through (n) for each flow control valve, and indicating a pass condition when all flow control valves have resulted in a difference greater than said predetermined value.

2. The method of claim 1 wherein the controlled atmosphere system includes a display which includes display segments and indicator lamps, and including the steps of;
displaying all display segments, and
lighting all indicator lamps, both for a predetermined time period.

3. The method of claim 1 wherein the controlled atmosphere system is used in conjunction with a refrigeration system which also has an electric control, to control the atmosphere and temperature in a confined space which has an access door having an electrically energized door lock, including the following steps prior to step (a):
sending a message to the refrigeration system controller that the controlled atmosphere system is in its automatic checking mode to prevent the refrigeration system from going into a mode that will interfere with the automatic checking mode; and
energizing the door lock.

4. The method of claim 1 wherein the system includes a temperature sensor for providing the temperature of the air leaving the heater, and wherein the electric control includes means for controlling the heater within a range of a predetermined setpoint temperature, and, the heater has an overtemperature switch, including the steps of:
determining that the system pressure is greater than a predetermined value;
closing the drain valve and the flow control valves;
energizing the heater;
comparing the temperature leaving the heater with the predetermined setpoint temperature, if the temperature leaving the heater is within the range of the setpoint for a predetermined length of time, indicating a pass condition;
indicating a fail condition if the temperature leaving is not within the range of the setpoint for the first predetermined time period, and, the elapsed time of the comparison exceeds a second longer predetermined time; and
indicating a fail condition if the overtemperature switch opens.

5. The method of claim 1 wherein the system includes an oxygen sensor for generating an output indicating oxygen level in a gas, and a carbon dioxide sensor for generating an output indicating carbon dioxide level in a gas, the sensors being arranged in serial flow relation with one another, and, means for selectively directing at least outside air or a sample of the confined space atmosphere to the sensors, including the steps of:
energizing the air compressor;
directing a flow of outside air over the sensors;
comparing the indicated output from the oxygen sensor with a predetermined expected output for the sensor with gas containing 20.9% oxygen being passed therethrough;
indicating a pass if the sensor output matches the predetermined expected output within a predetermined time period;
indicating a fail if the predetermined time period elapses before a match occurs.

6. The method of claim 5 wherein the system includes means for flowing a calibration gas containing 5% carbon dioxide and 95% nitrogen to the sensors, including the steps of:
establishing a flow of the calibration gas through the sensors;
comparing the indicated output from the oxygen sensor with a predetermined expected output for the sensor with a gas containing 0% oxygen being passed therethrough;
indicating a pass condition if a match of the output with the expected output occurs within a predetermined time period; and
indicating a fail condition if a match does not occur within the predetermined time period;
comparing the indicated output for the carbon dioxide sensor with a predetermined expected output for the sensor with a gas containing 5% carbon dioxide being passed therethrough;
indicating a pass condition if a match of the output with the expected output occurs within a predetermined time period; and
indicating a fail condition if a match of the output with the expected output does not occur within the predetermined time period.

7. The method of claim 1 wherein the system includes two flow control valves and a fixed orifice in parallel fluid flow with the valves, and an oxygen sensor for generating an output indicating the oxygen level in a gas, and, means for directing a flow of the gas exiting from the control valves therethrough, including the steps of:

energizing the air compressor;

determining that the system pressure is greater than a predetermined value;

establishing a flow of the gas exiting from the flow valves through the oxygen sensor;

closing both flow control valves to thereby establish a high nitrogen purity, low flow condition;

comparing the indicated oxygen output from the oxygen sensor with a predetermined expected oxygen level range;

comparing system pressure with a predetermined expected range for a high pressure, low flow condition;

opening one of the flow control valves, if the oxygen output and the pressure comparisons of the previous two steps are within the expected ranges, to thereby establish a medium nitrogen purity, medium flow condition;

comparing the indicated oxygen output from the oxygen sensor with a predetermined expected oxygen level range;

comparing system pressure with a predetermined expected range for medium purity, medium flow conditions;

opening both flow control valves if the oxygen output and the pressure comparison of the previous two steps are within the expected ranges, to thereby establish a low nitrogen purity, high flow condition;

comparing the indicated oxygen output from the oxygen sensor with a predetermined expected oxygen level range;

comparing system pressures with a predetermined expected range for low purity, high flow conditions;

if all of the above comparisons are satisfied, within a predetermined time period, indicating a pass condition;

if all of the above comparisons are not satisfied, within the predetermined time period, indicating a fail condition.

8. The method of claim 7 wherein the system includes a carbon dioxide sensor for generating an output indicating the carbon dioxide level in a gas, and, means for directing the flow of gas exiting from said control valves therethrough, including the following steps after a receipt of a pass indication of claim 7:

closing both flow control valves;

establishing a flow of the gas exiting from the flow valve through the carbon dioxide sensor;

comparing the indicated carbon dioxide output from the carbon dioxide sensor with a predetermined expected value for gas containing 0% oxygen;

indicating a pass if a match of the output with the expect 0% output occurs within a predetermined time period.

* * * * *